(12) United States Patent
Rose

(10) Patent No.: US 8,171,967 B2
(45) Date of Patent: May 8, 2012

(54) TIRE RETREAD APPARATUS

(75) Inventor: Andrew F. Rose, Powell, WY (US)

(73) Assignee: Composite Building Products, Inc., Powell, WY (US)

( * ) Notice: Subject to any disclaimer, the term of this patent is extended or adjusted under 35 U.S.C. 154(b) by 248 days.

(21) Appl. No.: 12/509,124

(22) Filed: Jul. 24, 2009

(65) Prior Publication Data

US 2011/0017371 A1    Jan. 27, 2011

(51) Int. Cl.
*B60C 27/20*    (2006.01)
*B60C 27/12*    (2006.01)
*B60C 11/02*    (2006.01)

(52) U.S. Cl. ............... 152/175; 152/172; 152/185.1; 152/187; 152/209.6

(58) Field of Classification Search .......... 152/170, 152/171, 172, 173, 175, 178, 179, 185, 185.1, 152/187, 190, 191, 209.6, 213 R, 213 A, 152/219, 221; 301/41.1, 43, 44.1
See application file for complete search history.

(56) References Cited

U.S. PATENT DOCUMENTS

| | | | |
|---|---|---|---|
| 781,318 A | 1/1905 | Weed | |
| 938,371 A * | 10/1909 | Davey | 152/219 |
| 1,187,173 A * | 6/1916 | Putnam | 152/172 |
| 1,200,355 A * | 10/1916 | Howard | 152/171 |
| 1,259,776 A * | 3/1918 | Putnam | 152/172 |
| 1,305,400 A * | 6/1919 | Novy | 152/178 |
| 1,342,753 A | 6/1920 | McGeorge | |
| 1,386,271 A * | 8/1921 | Maguire | 132/68.1 |
| 1,952,944 A | 3/1934 | Ruffertshofer | |
| 2,046,159 A | 6/1936 | Gottlieb | |
| 2,346,477 A * | 4/1944 | Ederer | 152/221 |
| 2,915,101 A | 12/1959 | Kratz | |
| 3,669,172 A * | 6/1972 | Stedman | 152/171 |
| 3,750,734 A | 8/1973 | McCord | |
| 3,856,068 A | 12/1974 | Callaghan et al. | |
| 3,875,987 A | 4/1975 | Nesseth | |
| 4,068,905 A | 1/1978 | Black et al. | |
| 4,128,446 A | 12/1978 | Dohmeier | |
| 4,132,258 A | 1/1979 | Vidakovic et al. | |
| 4,135,564 A | 1/1979 | Müller et al. | |
| 4,289,185 A | 9/1981 | Franchini et al. | |
| 4,295,510 A | 10/1981 | Foxcroft | |
| 4,321,955 A | 3/1982 | Rieger et al. | |
| 4,481,990 A | 11/1984 | Rieger et al. | |
| 4,733,705 A | 3/1988 | Dwiggins | |
| 5,961,754 A | 10/1999 | Benson | |

(Continued)

FOREIGN PATENT DOCUMENTS

DE    3823661 A1 *    3/1989

(Continued)

OTHER PUBLICATIONS

Machine Translation of FR 2555516 A1.*

(Continued)

*Primary Examiner* — Kip T Kotter
(74) *Attorney, Agent, or Firm* — Dorsey & Whitney LLP

(57) ABSTRACT

A device for extending the life of a tire and providing a new tread layer, principally for off road truck tires, has a mechanically attached surface tread of rubber blocks cooperatively connected with a cable system and specialized tensioning. The apparatus is generally suited to tires of very large size, typically used on dump trucks in open pit mining applications.

19 Claims, 5 Drawing Sheets

U.S. PATENT DOCUMENTS

| | | | |
|---|---|---|---|
| 6,016,856 | A | 1/2000 | Hynes |
| 6,325,122 | B1 | 12/2001 | Appleton |
| 7,104,299 | B2 | 9/2006 | Rayman et al. |
| 7,207,366 | B2 | 4/2007 | Sandstrom et al. |
| 7,299,841 | B2 | 11/2007 | Andonian et al. |

FOREIGN PATENT DOCUMENTS

| | | | |
|---|---|---|---|
| FR | 2555516 A1 | * | 5/1985 |
| GB | 2135252 A | * | 8/1984 |
| JP | 56157608 A | * | 12/1981 |

OTHER PUBLICATIONS

Author Unknown, ASARCO Copper Mine Pictures for Haul Truck Tire, http://gocalifornia.about.com/bl_azasarcophoto_tire.htm, Feb. 14, 2008, 1 page.

Author Unknown, "Komatsu's Largest Hauler Hits the Road," E&MJ, Jul./Aug. 2008, 1 page.

* cited by examiner

US 8,171,967 B2

TIRE RETREAD APPARATUS

TECHNICAL FIELD

Implementations discussed herein are related to new or replacement tire retread layers.

BACKGROUND

Haul trucks used in the mining industry require large tires and these tires are often replaced semi-annually. A typical mining haul truck generally requires six tires that represent a replacement cost of over $100,000 per tire, and are replaced twice annually. Therefore, a single typical haul truck requires a tire replacement expense exceeding $1.2 million annually. In the Powder River Basin of Wyoming, which is mined extensively for coal, there is estimated to be 500 of these trucks. In the northeast corner of Wyoming alone, it is estimated that over 500 million dollars annually is spent on replacement tires.

Discarded and stockpiled tires are an environmental and health risk. They are very heavy (often over 3 tons per tire) and replacement requires expensive "downtime" for the haul truck. The problem is compounded significantly considering the number of these trucks across the country—or world— and the increasing demands placed on natural rubber harvest. As demands upon virgin rubber escalate, alternatives to single piece tires must be developed.

Most extended tire wear systems are known as "retreads" which attempt to adhere a new tread surface to an existing worn tire or carcass. These applications are directed at vehicles that may travel at high speeds on pavement, and are susceptible to failure under high heat and stress. Retention of two-piece tires under flexure, loading, and rotation is a continuing problem.

The information included in this Background section of the specification, including any references cited herein and any description or discussion thereof, is included for technical reference purposes only and is not to be regarded subject matter by which the scope of the invention is to be bound.

SUMMARY

Implementations discussed herein are directed to a tire tread device with fasteners to securely restrain the tire tread device to a worn tire or carcass under heavy equipment operations. Under the flexure of tires, during rotation with heavy load, the disclosed tire tread device may restrain and prevent independent movement of the tread device from a worn tire or carcass in which it is mounted. Implementations discussed herein provide for better internal heat dissipation and attachment to a tire without separation.

A reliable and strong support structure for a replacement tire tread is disclosed. Individual tire tread pads may be mechanically attached to a worn tire or carcass with barbed attachments. A cable system in which cables are embedded within the tread pads further restrains the tread pads around the tire. The cable system may transfer forces in tension, but not in compression. The cables may compress at the leading and trailing edge of the tire footprint during tire rotation under high load.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

DETAILED DESCRIPTION

Figure 1:
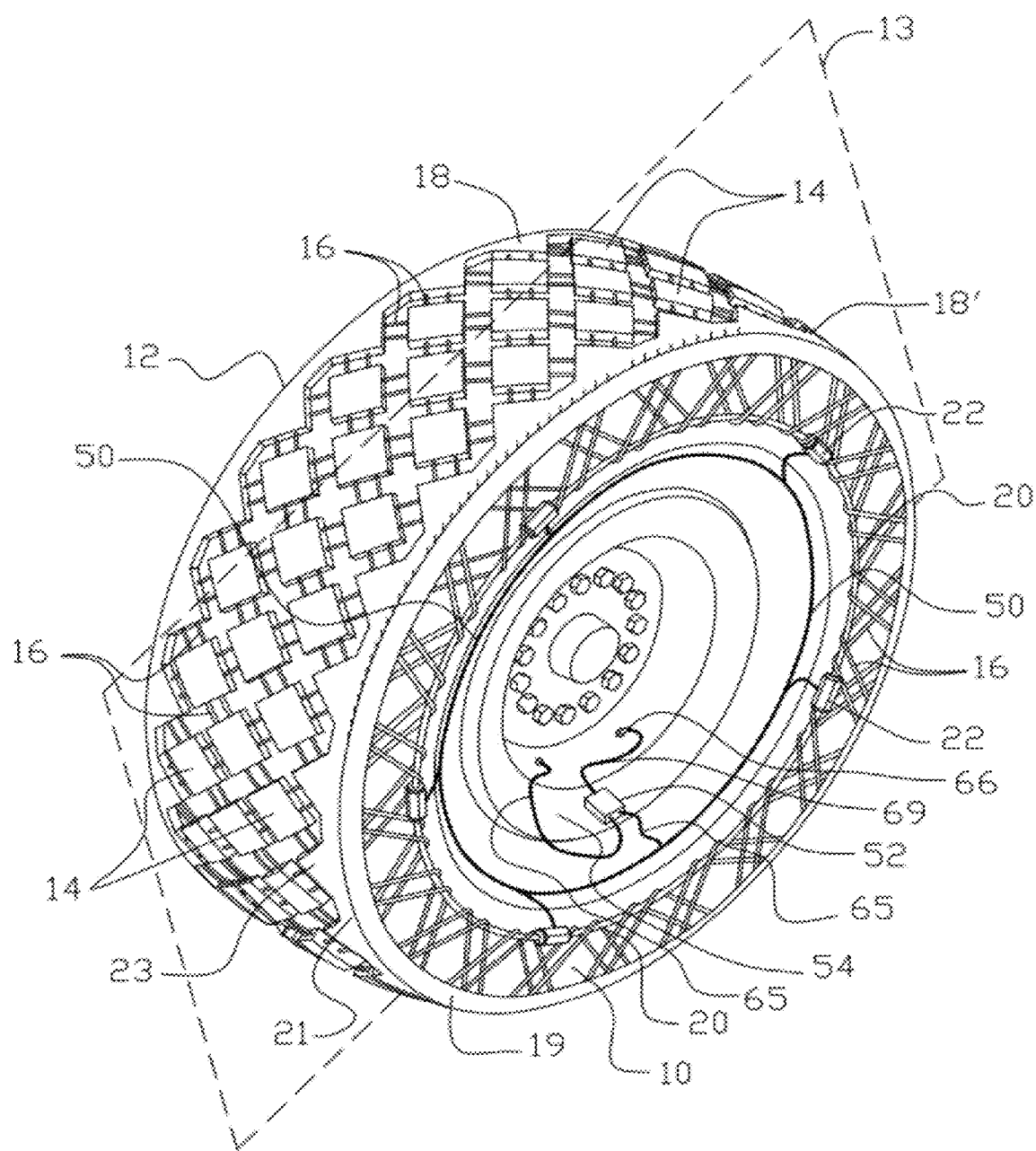
FIG. 1 is an isometric view of an implementation of a tire retread apparatus attached to a tire.

FIG. 1 shows a tire 10 with a tire tread apparatus 12 shown generally as installed. A series of tread pads in the form of rubber blocks 14 separated from each other and arranged in a diagonal patchwork pattern are mechanically attached (e.g., cast) to a network of cables 16. The rubber blocks 14 may be square or other shapes that lend to good traction. The rubber blocks 14 are positioned against the tread of a worn or carcass tire 10. The cables 16 may be arranged at angles of 45 degrees from the equatorial plane 13 of the tire 10, or may be at other convenient angles in relation to the equatorial plane 13. The cables 16 pass through multiple of the rubber blocks 14, entering and exiting each of the four sides of the blocks 14. In this implementation, two cables enter or exit each side of the blocks 14.

The cables 16 are further arranged between and mechanically attached (e.g., cast) to rubber shoulder pads 18 and 18' placed against the shoulder of tire 10. In this implementation, the shoulder pads 18, 18' are formed as a sidewall strip 19 and an edge strip 21 formed generally at a perpendicular angle to the sidewall strip 19 and with triangular projections 23 with sides parallel to sides of adjacent rubber blocks 14. The cables 16 enter the triangular projection 23 of the shoulder pads 18 and 18' then bend at an angle near 90 degrees from entry to exit from the sidewall strip 19 along the sidewall of the tire 10. The cables 16 then pass around an additional annular sidewall cable 20 and return outward where they enter the sidewall strip 19 and exit respective triangular projections 23 to cross the tread surface of the tire 10, through the blocks 14, and to the opposing edge rim 18, 18'.

The cable 20 may be composed of multiple segments in sequence, with ends of each segment attached within a tensioning fastener, for example, a tightening cylinder 22. When each of the tightening cylinders 22 is tightened to an operational force, the entire circumference of the sidewall cable 20 may reach uniform and equal tensile force. In operation the rubber blocks 14 and rubber shoulder pads 18 and 18' may act as replacement tread of the tire 10 and may be installed when the original tire 10 is sufficiently worn out.

Figure 2:
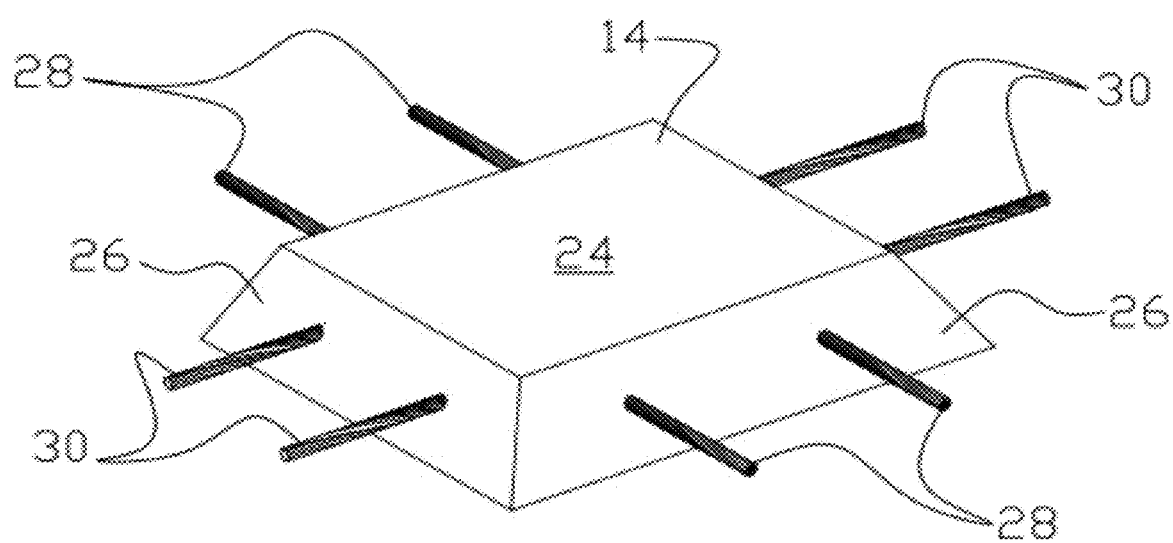
FIG. 2 is a top isometric view of rubber tread section.

FIG. 2 shows a typical tread pad in the form of a rubber block 14. The rubber block 14 is generally a vulcanized rubber of similar composition to the tire 10. Implementations are not limited to vulcanized rubber, however, and other tread compounds may constitute rubber block 14. The top surface 24 is generally of square shape and this top surface 24 is what contacts the ground upon the rotation of tire 10. However, as previously stated, the rubber block may be provided in any of a variety of tread shapes. In some implementations, there may be a variety of different shaped rubber blocks 14 in a particular tread design of the tire tread apparatus 12. The rubber block 14 also has four sloping sides 26, as shown. The dimensions of the rubber block 14 are not limited, but generally may be on the order of 10 in. by 10 in. square on the top surface 24. The rubber block may have a thickness generally of 2-4 in.

The cables 16 shown in FIG. 1 are relabeled for clarity in FIG. 2 as cable pairs 28 and cable pairs 30. The cable pairs 28 and 30 are cast within the rubber block 14. The cable pairs 28 may cross the cable pairs 30 at right angles and may pass above or below in reference to each other within the rubber block 14. The cable pairs 28 and 30 are not limited in size and type, but generally are a braided steel which may be ¼ in. diameter. The cable pairs 28 and 30 may not deform within the rubber block 14. However, cable pairs 28 and 30 may, upon rotation of the tire 10, collapse or deform in the interval between an adjacent rubber block 14. This is particularly the case when the leading edge, trailing edge, and footprint of the tire 10 is in compression.

Figure 3:
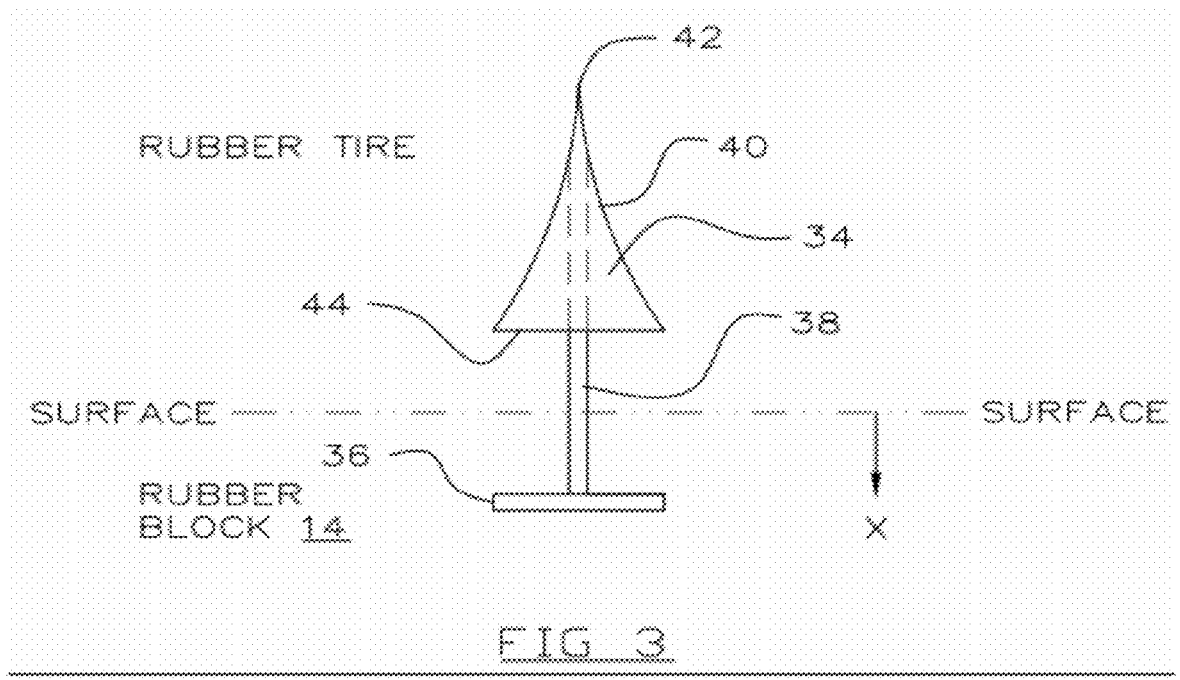
FIG. 3 is a schematic view of a typical spike in a rubber tread section.

FIG. 3 is a detailed view of a spike 34 for holding the tread pads to the tire 10. In some implications the length of the spike 34 may be generally 2-4 inches. The spike 34 shown may include a base 36, a stem 38, and a barb 40. The barb 40 may be in the shape of a conical horn, with a sharpened point 42 and a circular rim 44. The spike 34 is typically a metal such as steel, but may be made of other materials. The barb 40 may be of such a configuration that a cavity is defined between the circular rim 44 and the stem 38.

Figure 4A:
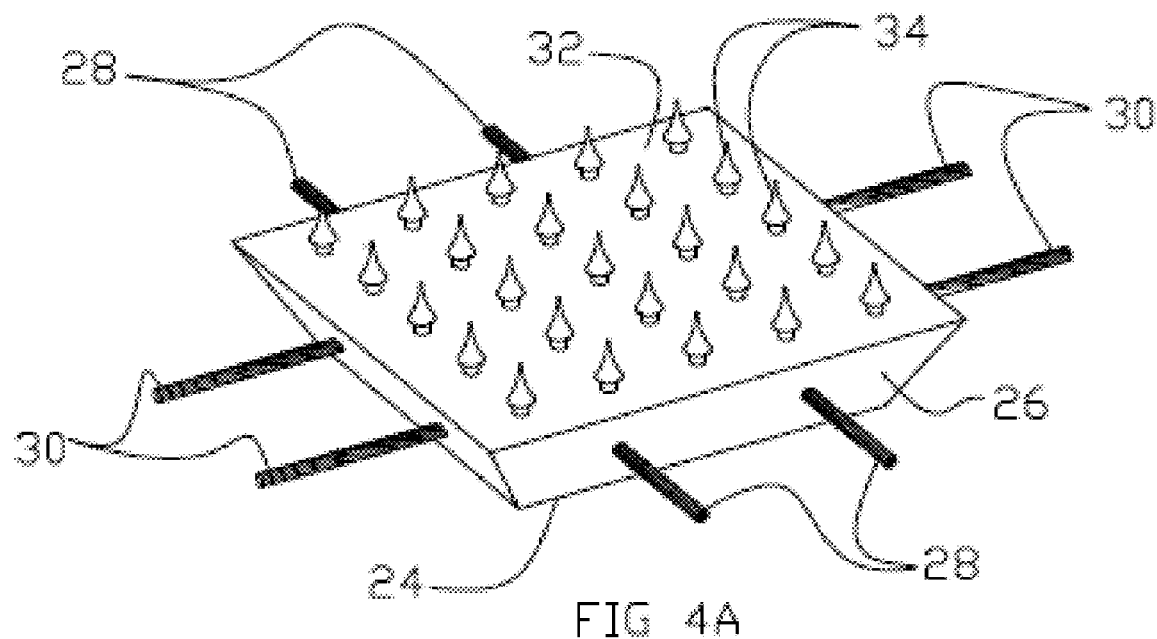
FIG. 4A is a bottom isometric view of the rubber tread section of FIG. 2.
Figure 4B:
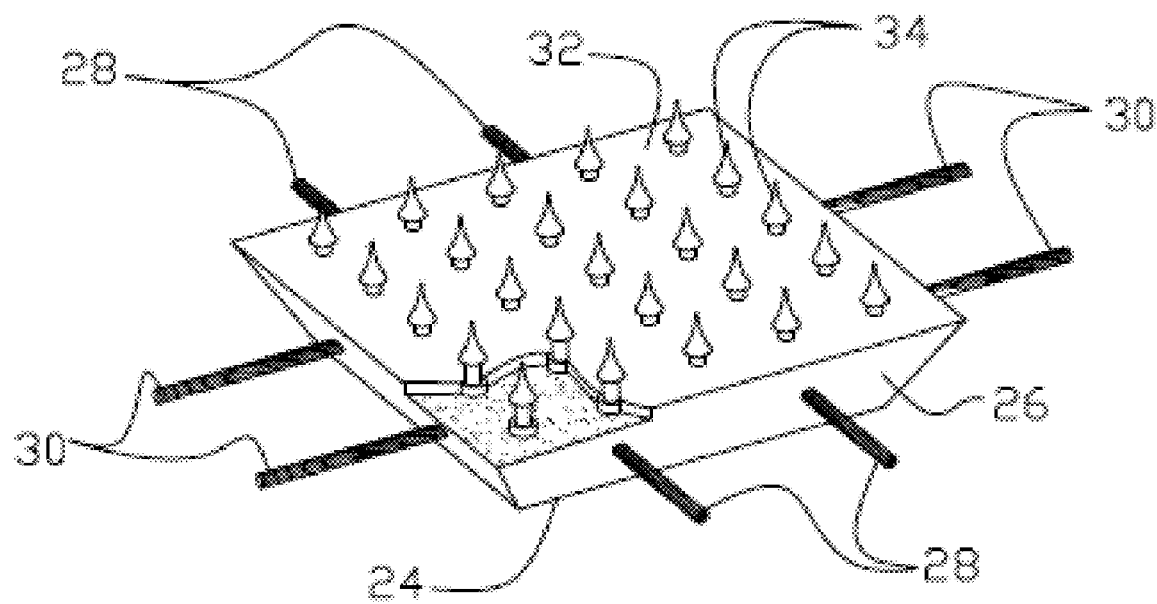
FIG. 4B is a partial cutaway view of FIG. 4A.

FIG. 4A is a perspective view of the rubber block 14 showing the bottom surface 32. A plurality of the spikes 34 are shown exiting bottom surface 32. In application, these spikes 34 may pierce and enter the original treads or carcass of the tire 10, acting to attach the rubber block 14 securely. While FIG. 4A shows approximately twenty-five spikes 34, there may be greater or fewer spikes 34 in other implementations. The spikes 34 may be formed with a flange as the base 36 around the stem 38 or other anchor structure at the end opposite the barb 40 in order to secure and embed the spikes 34 within the blocks 14 as shown in FIG. 4B.

The spikes 34 may be insert molded during manufacture of the rubber blocks 14. Before installation, the barb 40 may be coated with a lubricant to ease piercing into tire 10. While tensioning the cables 20 during installation, and during initial use, the spikes 34 may pierce into the rubber carcass treads of tire 10 in a way to stretch and not cause excessive tears in the rubber or construction of tire 10. The flanged base 36 is of sufficient diameter to securely maintain the spikes 34 rigidly in rubber block 14.

The bottom surface 32 may be somewhat larger than the top surface 24, which results in the sloped sidewalls 26. The bottom surface 32 acts as a base of attachment of the rubber block 14 to the tire 10. Heavy loads carried by excavating and haul equipment are transferred through the tire 10 to the rubber block 14 through this bottom surface 32.

Figure 5:
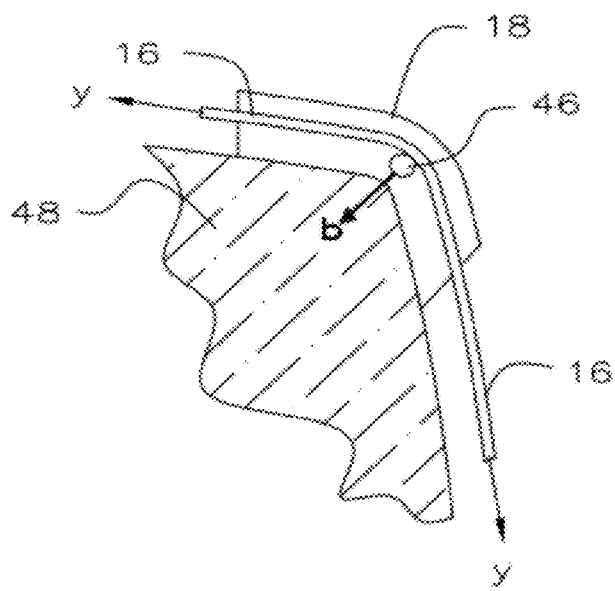
FIG. 5 is a cross-section view of a portion of FIG. 1 detailing the tire retread apparatus against a shoulder of the tire.

FIG. 5 is a cross-sectional view of rubber shoulder pads 18 and 18'. The cable 16 is shown entering and exiting shoulder pad 18 and passing over an internal steel cable 46 running circumferentially within the shoulder pads 18, 18'. The tire carcass 48 is shown in hatching in FIG. 5. The internal steel cable 46 is of somewhat larger diameter than the cables 16. Under sufficient tightening of the tightening cylinders 22 and the resulting tension in the sidewall cable 20, the cables 16 may develop a tensile force "y" as shown. The tensile force "y" may become uniform throughout all of cable segments 16 within each of multiple rubber blocks 14 and the spaces between rubber blocks 14. Within rubber section 18 and 18', the cables 16 bear directly against the internal steel shoulder cable 46 and may, under high tensile force, direct a force "b" against the shoulder cable 46 drawing the shoulder cable 46 in towards the shoulder 48 of the tire carcass 10. The tensioning system of tightening cylinders 22, sidewall cable 20, cables 16, and barbs 40, acts to retain the rubber blocks 14 and rubber shoulder pads 18 and 18' onto tire 10. While the rubber tire 10 may deform and flex under movement with heavy loads, the multiple rubber blocks 14 and shoulder pads 18 and 18' may remain statically positioned relative to and against the rubber tire 10.

Each of tightening cylinders 22 shown, e.g., in FIG. 1, may be preset to an equivalent gripping pressure. The tightening cylinders 22 may be interconnected by supply line 50 to maintain a uniform fluid pressure among all tightening cylinders 22. In practice, tightening cylinders 22 may be of hydraulic or pneumatic control. In pneumatic or air control, the internal air pressure of the tire, typically 100-120 psi, is drawn through the tire air valve 66, and air hose 69, and into a booster regulator 52 mounted to the rim 54 of the wheel. The booster regulator 52 may provide a 4× boost in air pressure to 400-500 psi. An exemplary booster regulator 52 may be a SMC Model NVBA1111-T02G-N. The high-pressure air then is maintained to the supply line 50 by distribution lines 65, becoming available to each of tightening cylinders 22. The distribution line 65 to the backside of the tire 10 may be routed through a hole in the rim 54 as shown in FIG. 1. The tightening cylinders 22 may be found in multiple configurations. One example is a FABCO-AIR "pancake cylinder" Model PSD, double-acting, single rod in 2½ in diameter, 3 in stroke. The tightening cylinders 22 may achieve a force in excess of 1,000 lbs, which is distributed throughout the cables 16.

The booster regulator 52 may take the form of an independent hydraulic pump 52 as shown in FIG. 1 mounted on the rim 54 of the tire 10. Alternatively or in combination, a hydraulic or pneumatic system of the internal truck or equipment systems may be used. In another embodiment the tightening cylinders 22 may be replaced with spring systems or other tensioning systems. The tightening system may be found on both sides of the tire 10. High tensile force in the cable 20 is maintained by fluid pressure applied to tightening cylinders 22, which leads to uniform and equal tensile forces in cables 16. It should be understood that air is considered a fluid in this disclosure.

Figure 6A:
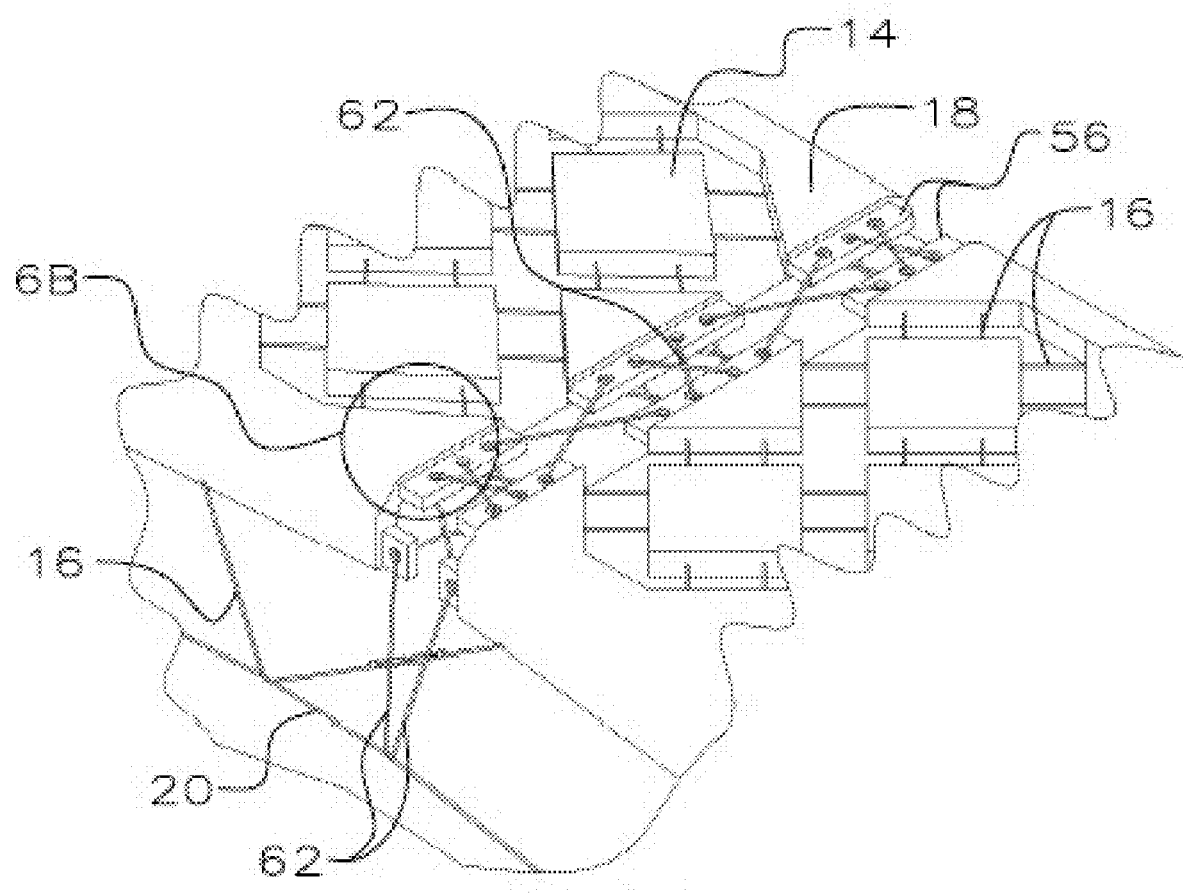
FIG. 6A is an isometric view of a tread splice in the tire retread apparatus.
Figure 6B:
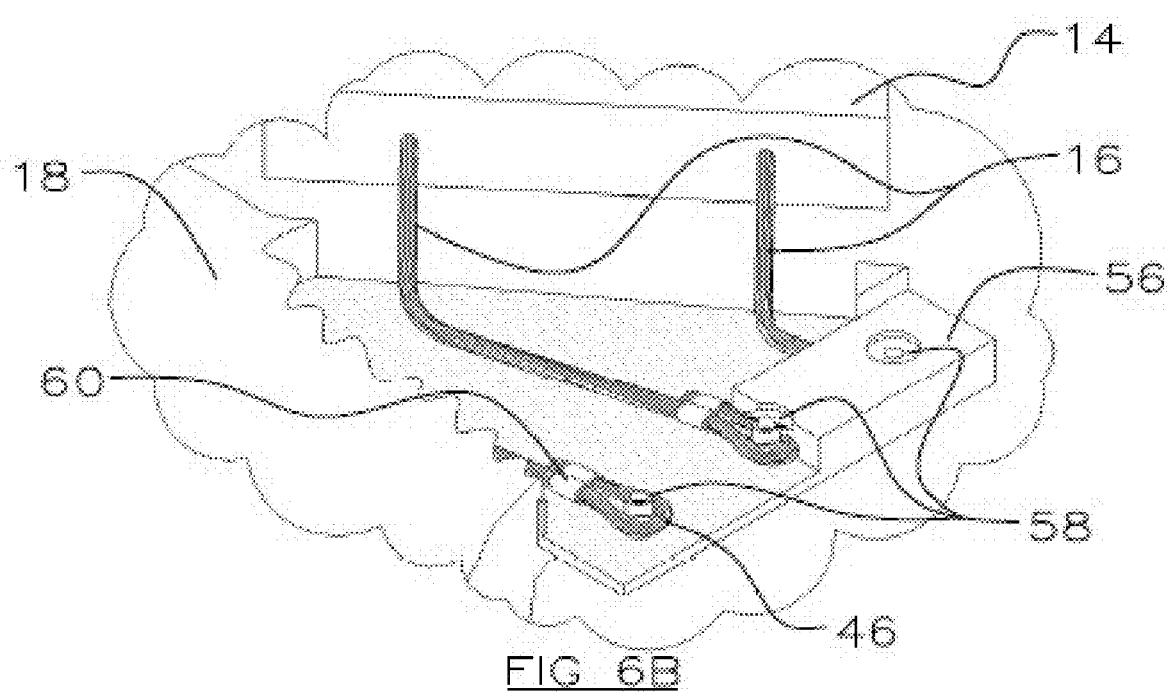
FIG. 6B is a partial cutaway of a portion of FIG. 6A.

FIG. 6A is a detail of end attachment. During manufacture the tire tread apparatus 12 may be molded as one completed interconnected assembly with a first end and second end, as shown. A number of tie plates 56 may be insert molded within rubber blocks 14 and also insert molded within rubber sections 18 and 18', as shown. Referring to FIG. 6A, the tie plates 56 also contain hollow eyelets 58 in which cables 16 are securely attached, for example, with the use of crimp clips 60. The hollow eyelets 58 are threaded with a tie cable 62 as shown. During installation, the tire tread apparatus 12 may be shrouded or covered over the worn tire 10 and tightened with the tie cable 62. After tightening with the tie cable 62, the tightening cylinders 22 are set to pressure causing a uniform and continuous tensioning of the entire system of cables 16.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A tire tread apparatus, comprising
a plurality of tread pads adapted for engagement with a tread surface of a tire;
a cable network interconnecting the plurality of tread pads;
first and second shoulder pads adapted for circumferential engagement about a first and second shoulder of the tire, the first and second shoulder pads cooperatively interconnected with the plurality of tread pads through the cable network;
a first annular cable depending from the first shoulder pad adjacent the first sidewall of the tire; and
a second annular cable depending from the second shoulder pad adjacent a second sidewall of the tire; wherein
the first and second annular cables are formed in respective closed loops by one or more tensioning fasteners; and
the first and second annular cables are interlaced in cooperation with the cable network to effect a preset tension within the cable network through a constant tension applied to the first and second annular cables by the one or more tensioning fasteners.

2. The tire tread apparatus of claim 1, wherein the tensioning fasteners are tightening cylinders.

3. The tire tread apparatus of claim 1, wherein
the first annular cable is in operative engagement with a plurality of cable network portions;
each cable network portion has a first segment connected to a first tread pad, the first segment being substantially parallel to the tread surface of the tire;
the first segment passes through the first shoulder pad to form a second segment, the second segment being substantially parallel to the first sidewall of the tire;
the second segment passes around the first annular cable to form a third segment, the third segment being substantially parallel to the first sidewall of the tire;
the third segment passes through the first shoulder pad to form a fourth segment, the fourth segment being substantially parallel to the tread surface of the tire; and
the fourth segment is connected to a second tread pad.

4. The tire tread apparatus of claim 3, wherein
each of the first shoulder pad and the second shoulder pad includes an internal circumferential cable;
the cable network portions pass over and bear against the internal circumferential cable; and
the circumferential cable demarks a first transition between the first segment and the second segment and a second transition between the third segment and the fourth segment; and
the constant tension applied to the first and second annular cables by the one or more tensioning fasteners imparts a force through the cable network portions against the internal circumferential cable force, which is transferred into each of the first shoulder pad and the second shoulder pad and, consequently, against the first shoulder and second shoulder of the tire, respectively.

5. The tire tread apparatus of claim 1, wherein the tread pads and the shoulder pads are formed of a rubber compound.

6. The tire tread apparatus of claim 1, wherein the tread pads are blocks of a square shape, and the blocks include four sides, each side having two attachment points operable to connect the block to the cable network.

7. The tire tread apparatus of claim 6, wherein, for each of the blocks, a first cable network portion passes through the block and a second cable network portion passes through the block at substantially a right angle to the first cable network portion.

8. The tire tread apparatus of claim 1, wherein the tread pads include a bottom surface having a plurality of spikes embedded therein.

9. The tire tread apparatus of claim 8, wherein the tread pads include a top surface opposite from the bottom surface, the top surface having a smaller surface area than the bottom surface.

10. The tire tread apparatus of claim 8, wherein each spike includes a base, a stem, and a barb, and the base is formed as a retention structure to retain the spike within the tread pad.

11. The tire tread apparatus of claim 1, wherein the plurality of tread pads are arranged in adjacent tread pad groups, each tread pad group having a plurality of tread pad group members arranged substantially in a line.

12. The tire tread apparatus of claim 11, wherein the line on which the tread pad group members are arranged forms an acute degree angle with a plane defined by a first sidewall of the tire.

13. The tire tread apparatus of claim 11, wherein each tread pad group includes
a first end tread pad having a first side connected to the first shoulder pad and a second side connected to the first shoulder pad;
a second end tread pad having a first side connected to the second shoulder pad and a second side connected to the second shoulder pad; and
a center tread pad having a first side connected to a third side of the first end tread pad and a second side connected to a third side of the second end tread pad.

14. The tire tread apparatus of claim 13, wherein
a fourth side of the first end tread pad is connected to a center tread pad of a first adjacent tread pad group;
a third side of the center tread pad is connected to a second end tread pad of the first adjacent tread pad group and a fourth side of the center tread pad is connected to a first end tread pad of a second adjacent tread pad group; and
a fourth side of the second end tread pad is connected to a center tread pad of the second adjacent tread pad group.

15. The tire tread apparatus of claim 13, wherein
the first should pad includes a plurality of triangular sections;
the first side of the first end tread pad is connected to a first triangular section and the second side of the first end tread pad is connected to a second triangular section; and
the second triangular section is adjacent to the first triangular section.

16. The tire tread apparatus of claim 1, further comprising
a first end connector having a first tie plate connected to the first shoulder pad, a second tie plate connected to a tread pad half, and a third tie plate connected to the second shoulder pad;
a second end connector having a first tie plate connected to the first shoulder pad, a second tie plate connected to a tread pad half, and a third tie plate connected to the second shoulder pad; and
a tie cable passing through holes in each of the first, second and third tie plates of the first connector and through holes in each of the first, second and third tie plates of the second end connector;
wherein tightening of the tie cable causes the first end connector to be secured to the second end connector.

17. A method of providing a new tire tread layer, comprising
placing a plurality of tread pads interconnected within a cable network in contact with a tread surface of a tire, the treads pads having a plurality of spikes disposed on a bottom surface thereof;
placing first and second shoulder pads adapted for circumferential engagement about a first and second shoulder of the tire, the first and second shoulder pads cooperatively interconnected with the plurality of tread pads through the cable network;
attaching a first annular cable to depend from the first shoulder pad adjacent the first sidewall of the tire;
attaching a second annular cable to depend from the second shoulder pad adjacent a second sidewall of the tire; wherein
the first and second annular cables are formed in respective closed loops by one or more tensioning fasteners; and
the first and second annular cables are interlaced in cooperation with the cable network; and
applying a tensile force to the cable network to effect a preset tension within the cable network through a constant tension applied to the first and second annular cables by the one or more tensioning fasteners to cause the spikes to pierce into the tread surface of the tire and thereby maintain the plurality of tread pads in contact with the tread surface of the tire.

18. The method of claim 17, further comprising tightening a tie cable to bring together a first end connector and a second end connector mechanically connected with the plurality of tread pads.

19. The method of claim 17, further comprising presetting the one or more tensioning fasteners connected within the cable network to an equivalent tension setting.

* * * * *